United States Patent [19]

Hedrington

[11] Patent Number: 5,680,997
[45] Date of Patent: Oct. 28, 1997

[54] FOOD PROCESSOR

[75] Inventor: James A. Hedrington, Chippewa Falls, Wis.

[73] Assignee: National Presto Industries, Inc., Eau Claire, Wis.

[21] Appl. No.: 418,117

[22] Filed: Oct. 6, 1989

Related U.S. Application Data

[63] Continuation of Ser. No. 238,325, Aug. 30, 1988, Pat. No. 4,884,755.

[51] Int. Cl.⁶ .................................................. A47J 43/25
[52] U.S. Cl. ........................................ 241/93; 241/169.1
[58] Field of Search ................................. 271/93, 169.1, 271/273.1, 273.2, 273.3, 273.4

[56] References Cited

U.S. PATENT DOCUMENTS

4,856,718  8/1989  Gaber et al. ................. 241/169.1 X

*Primary Examiner*—Mark Rosenbaum
*Attorney, Agent, or Firm*—Merchant, Gould, Smith, Edell, Welter & Schmidt, P.A.

[57] ABSTRACT

An appliance for processing food items including a first housing and a second housing releasably attached to the first housing. The first housing has a handle to facilitate hand-held use. A cutting member is mounted in the second housing and apparatus is mounted in the first housing for driving the cutting member. The driving apparatus is connected to the cutting member and actuated by a switch. A locking member secures the two housings together and an alignment mechanism is provided to position the housings for proper operation of the locking member. In one embodiment the locking member is operatively connected to the switch so that when the appliance is turned on the two housings are simultaneously locked together. The cutting member is a plastic hollow frusto-conical housing with metal cutting blades integrally molded into the housing.

15 Claims, 5 Drawing Sheets

FOOD PROCESSOR

This application is a continuation of application Ser. No. 07/238,325 filed Aug. 30, 1988 and which issued as U.S. Pat. No. 4,884,755.

BACKGROUND OF THE INVENTION

1. FIELD OF THE INVENTION

This invention relates to an appliance for processing food products and, in particular, to a food slicer/shredder.

2. DESCRIPTION OF THE PRIOR ART

Food processors have become an increasingly popular kitchen appliance. Prior art food processors range from the very elaborate styles and models to a more recent introduction of smaller size food processors. These smaller versions are designed to rest on the countertop with the processed food being discharged into a bowl or other container positioned adjacent the discharge outlet of the processor. Typical of these types of food processors that have been commercially available include those that have a bowl that must be locked into place and which houses a disc type cutting blade that must be inserted over a drive shaft and secured. This type of prior art processor has a cover over the bowl with a chute through which the cut food items are discharged into a receptacle. Disposed beneath the cutting blade is what is typically referred to as a slinger disc which is designed to throw the cut food through the chute into the receiving container. This design has not proven to be very efficient in that the cut food items are not necessarily thrown into the discharge chute and some of the cut food products remain in the bowl housing the cutting disc an slinger assembly. In some cases there are bowls specially designed to fit the processor so that it becomes more effective in collecting the cut food. These types of prior art processors are not easy to assemble and disassemble and have a number of pieces that must be cleaned after use including the cutting bowl.

Other prior art food processing appliances are disclosed in U.S. Pat. Nos. 3,635,270; 4,386,740; and 4,390,133. These processors have a generally cylindrical cutter mounted within a housing that has a chute through which food products are pressed against the cutter that is rotatably driven. The sliced or shredded food products pass into the inside of the cylindrical rotating cutter and exit through an opening in the housing. These prior patents disclose that the housing for the cutter is removably attached to another housing which contains the drive motor. The cutter housing and the cutter can thus be removed for cleaning. The processors disclosed in these patents are also countertop units and not intended to be hand-held. The cutting elements of these prior art appliances are typically formed of metal. The process of forming these cutting elements is relatively expensive. In one such process, an initially flat metal blank is punched out to form cutting blades which are then sharpened. The metal blank is then rolled and welded to form the cylindrical cutting member. Then some bearing or support member must be welded at one end so that the cutting member can be connected to a driving motor. In another prior art process the metal cup is stamped from a flat blank. The cutting blades then must be formed from the inside out of the metal cup and sharpened. The amount of metal material used in these prior art assemblies and the process itself makes the assembly expensive.

The appliance disclosed is U.S. Pat. No. 3,635,270 has a metal cutting member which is attached to a driving plate. Upon removal of the cutting assembly and its housing the drive plate itself must still be cleaned. Moreover, at its outer end where the food is discharged from the assembly the cutting member is unsupported. The stress of the downward pressure applied as the food products are pressed against the cutting member may cause the cutting member to pull away from the drive plate or damage or bend the drive plate and the drive shaft. U.S. Pat. Nos. 4,390,133 and 4386,740 also do not appear to specifically disclose a support surface for the discharge end of the cutter.

Moreover, the appliances disclosed in these patents do not provide any support below the cutter blade housing. The continued downward exertion of force used in introducing the food items into the processor may tend to weaken the connection between the two housings, ultimately resulting in failure or breaking of the tab structure designed to lock the housings together. These structures are also more likely to tip over in response to this downward force. In the appliances disclosed in these patents it may also be possible, either inadvertently or intentionally, to separate the cutter housing from the motor housing while the motor is running and driving the cutting member. This could result in damage to the driving connection between the motor and the cutter and could cause the user's hands or fingers to accidentally strike the moving cutter.

The present invention addresses these short-comings and disadvantages of the prior art.

SUMMARY OF THE INVENTION

The present invention is a portable hand-held appliance for processing food items. The appliance includes a housing in which a driving means is contained. This housing has a handle member. Releasably attached to the first housing is a second housing containing the cutting member. The second housing has an opening into which the food items are introduced and a second opening from which these sliced or shredded food items are discharged. There is a means provided to connect the driving means to the cutting member and a means to lock the second housing in position attached to the first housing.

In use the operator can hold the appliance in such a manner that sliced food can be directed into a receiving container, such as a bowl or can be directed onto any desired surface. For example, the ingredients for homemade pizza, such as cheese, can be directed directly onto the pizza. This feature eliminates the intermediate slicing and collecting bowl in the prior art and provides for a more versatile appliance. In addition, the present invention is easily assembled and disassembled. The housing for the cutting means and the cutting member itself can be cleaned and the type of cutting member may be easily changed.

The locking means in the present invention secures the cutting member housing to the drive motor housing. The locking means is released to allow the cutter housing to be removed. In one embodiment the locking means is operatively connected to the switch of the driving motor so that when the switch is actuated to turn on the driving motor the locking means is simultaneously engaged to secure the cutter housing. In this manner in the appliance of the present invention it is not possible to separate the two housings while the drive motor is still running.

To ensure the proper operation of the locking means the present invention further incorporates a means to align the cutter housing with respect to the drive motor housing with the alignment in such a manner that the locking means is positioned to secure the two housings together. The motor housing also has a base member with a support surface upon which the cutter housing rests. In addition to providing support for the downward force that is exerted on the housing as food items are pressed against the cutting member, the base member with supporting surface also eliminates possibility of the appliance tipping over while the operator presses food products through the inlet chute of the housing.

The present invention also relates to a food shredder/slicer having an improved cutting member. The cutting member is a plastic hollow housing in which metal cutting blades are mounted. In a preferred embodiment the metal blades are formed and sharpened and then insert molded into the housing. The housing has a means at one end for connecting to a means for rotatably driving the cutting member. Formed at its opposite end, which is open for the discharge of sliced food items, is a bearing surface which is in contact with a cooperating bearing surface associated with a locking ring which retains the cutting member in the housing to provide support at the open end for the cutting member. This reduces the possibility that upon continued use of the appliance the substantial forces against the cutting member may cause the connection between the cutting member and the driving means to become damaged or misaligned. The cutting member of the present invention is less expensive both in materials and in the manufacturing steps than the prior art cutters formed of metal. In the preferred embodiment the cutting member is frusto-conical in shape, and the outward sloping inner surface of the cutter facilitates the discharge of sliced or shredded food items from the appliance.

In summary, the present invention is a user friendly, portable slicer/shredder. It is characterized by ease of assembly and disassembly for cleaning and versatility of use in allowing the user directional control of the sliced food items. It also incorporates an improved cutting member design that is easier and less expensive to manufacture than the prior art. The above-described advantages and others will become apparent with reference to the following drawings, detailed description of the invention, and claims.

DETAILED DESCRIPTION OF THE INVENTION

Figure 1:
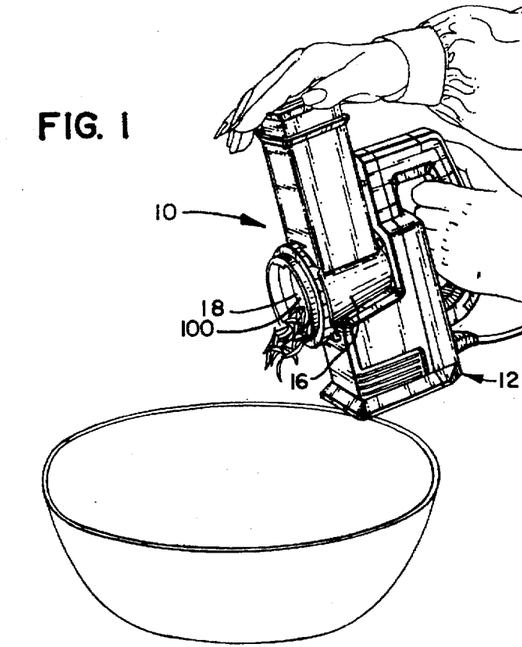
FIG. 1 is a view in perspective showing the use of the appliance of the present invention.

Referring to the drawings wherein like numerals represent like parts throughout the several views FIG. 1 illustrates use of appliance 10 of the present invention. Appliance 10 has a first housing 12 in which an electric motor (not shown) is mounted. Appliance 10 also includes a second housing 14 wherein the food items are sliced or shredded. Housing 14 has a first member 16 in which a rotatable cutting means 100 is housed. Member 16 is generally frusto-conical in shape as shown in more detail in FIGS. 6 and 7, and has an opening at 18 through which the cut food items are discharged from the appliance. Member 16 has a second opening at 20 through which the motor is connected to the cutting means as will be described in more detail hereafter. Housing 14 has a chute member 22 integrally connected to first member 16 and through which food items are pushed against the rotating cutting member 100. Chute member 22 communicates with first member 16 through an opening at 24.

Figure 9:
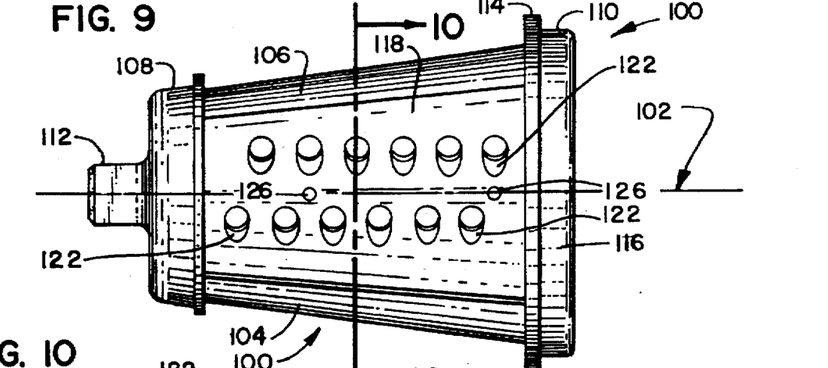
FIG. 9 is a plan view of one embodiment of a cutting member of the present invention.
Figure 10:
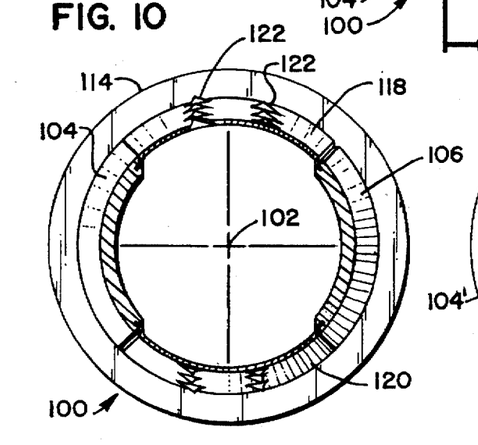
FIG. 10 is a cross-sectional view of the cutting member taken generally along lines 10—10 of FIG. 9.
Figure 11:
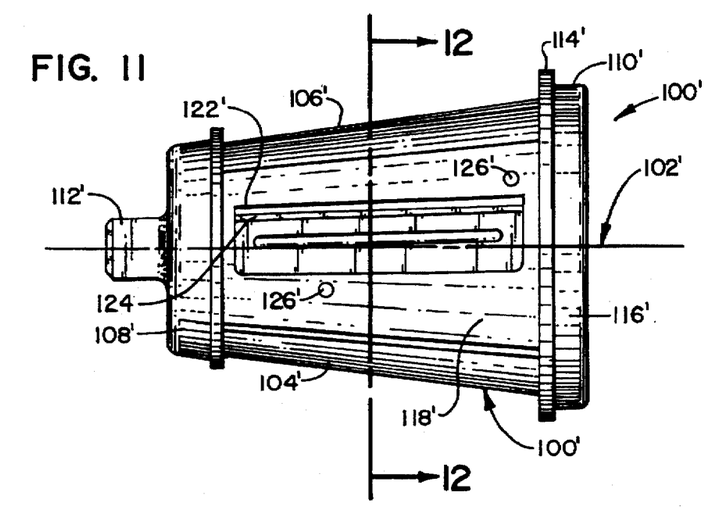
FIG. 11 is a plan view of another embodiment of the cutting member of the present invention.
Figure 12:
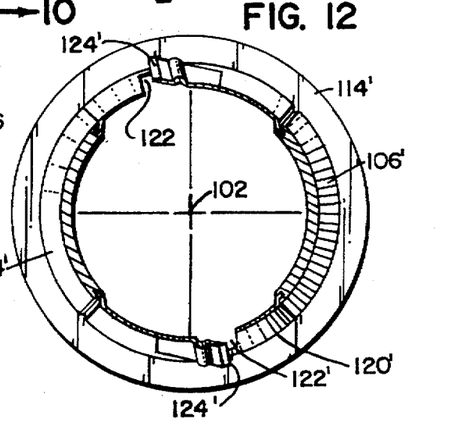
FIG. 12 is a cross-sectional view of the cutting member taken generally along lines 12—12 of FIG. 11.

Cutting member 100 is shown in more detail in FIGS. 9 and 10. Cutting member 100 is generally frusto-conical in shape having a central rotational axis at 102. Member 100 has a pair of arcuate wall sections 104 and 106, a first end section at 108 and a second end section at 110. End section 108 closes the cutting member 100 at its smaller diameter end. Section 108 has a member at 112 for connection to a means for rotatably driving member 100 about axis 102. End section 110 has an annular rim at 114 and a bearing surface at 116. Oppositely disposed about axis 102 are a pair of cutting blades 118 and 120. In the embodiment shown in FIGS. 9 and 10 cutting blades 118 and 120 are of the type which shreds foods products. Blades 118 and 120 are metal and have a plurality of holes 122 punched therein to form sharpened cutting edges shown in more detail in FIG. 10. FIGS. 11 and 12 illustrate another embodiment of the cutting means where the cutting blades are designed to slice as opposed to shred food products. In other respects the structure of the slicing cutting member 100' is the same as the shredder cutting member 100. Member 100' therefore includes wall sections 104' and 106' and end sections 108' and 110'. Mounted about the central rotational axis 102' are slicing cutting blades 118' and 120'. Cutting blades 118' and 120' are formed with an elongated opening at 122' and with a sharpened cutting edge at 124'.

Cutting members 100 and 100' are formed in the following process. With respect to the shredding blades, with the metal in a flat or planar configuration, holes 122 are punched. Next there is a drilling operation to countersink holes 122 in order to sharpen the cutting edges. Metal blades 118 and 120 are then formed into an arcuate shape. Blades 118 and 120 are then mounted in a mold. There is an insert molding operation where the plastic wall sections 104 and 106 and end sections 108 and 110 are formed with blades 118 and 120 molded in place. Cutting member 110' is formed in a similar manner with cutting blades 118' and 120' formed and sharpened and then molded in place. The cutting blades are provided with holes 126 and 126' which receive alignment pins of the mold to hold the cutting blades in proper position during the insert molding process. Cutting members 100 and 100' are a less expensive part than the prior art in that metal is used only for the blade segments while the remainder is less expensive plastic material, and further in that the manufacturing process compared to the prior art cutting members formed completely of metal is a less complex and therefore less expensive process.

The motor mounted within housing 12 may be of any conventional prior art configuration and is electrically driven. It is contemplated that the motor may be powered by alternating current from a wall outlet or may be battery powered. The motor is connected by known gear and clutch arrangements to a driving member 28 in housing 12. Driving member 28 is provided with a generally square-shaped slot at 30 or an equivalent construction. Each cutting member 100 designed to be used with appliance 10 must be provided with a driven member 112 that mates within slot 30.

Figure 6:
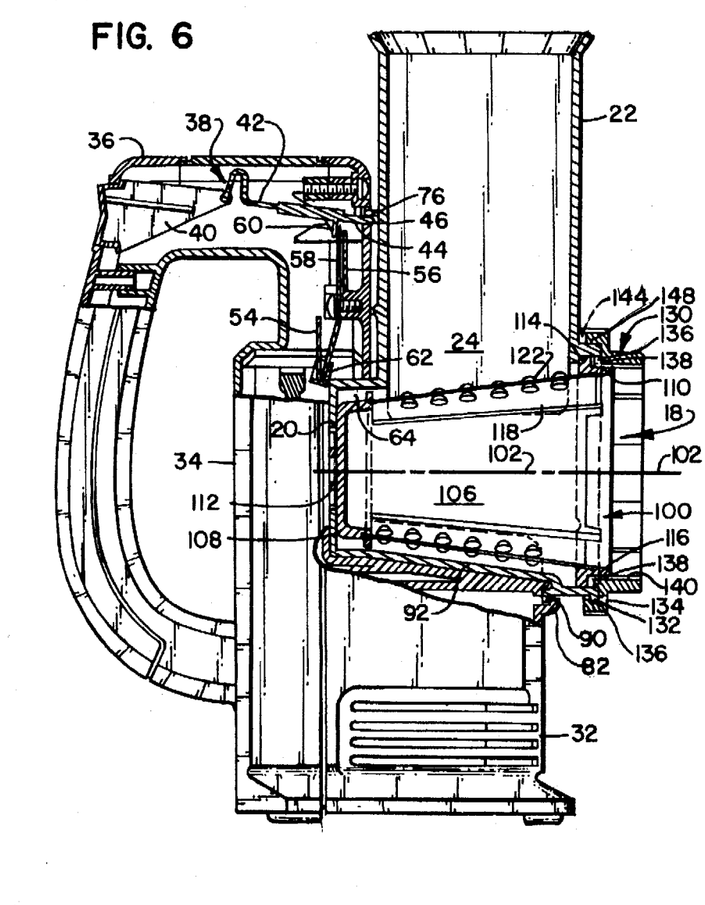
FIG. 6 is a sectional view taken generally along the line 6—6 of FIG. 5.
Figure 7:
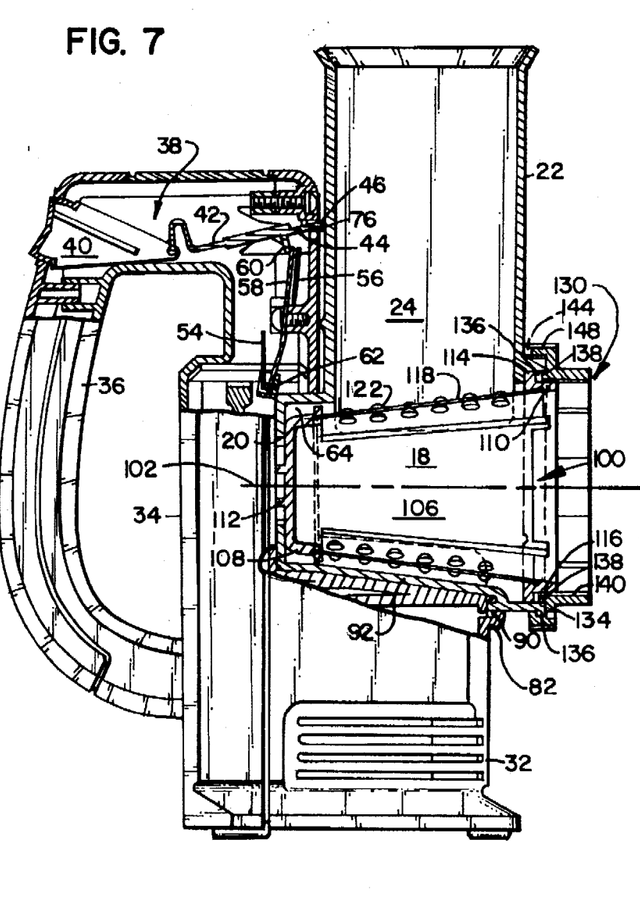
FIG. 7 is a sectional view taken generally along line 7—7 of FIG. 5.

FIGS. 6 and 7 illustrate the mounting of cutting member 100 in housing 14. Member 112 extends through opening 20 and is received within slot 30 of driving member 28. Member 100 is held in place by a locking-returning-ring 130. Ring 130 has a plurality of locking members 132 spaced about its circumference which define locking channels at 134. Disposed about opening 18 on housing 14 are a plurality of locking tabs at 136 which are received within channels 134. Ring 130 has an annular surface at 138 which in cooperation with rim 114 prevents cutting member 100 from axial movement out of housing 22. Ring 130 also has bearing surfaces at 140 against which bearing surface 116 of member 100 rest providing support for end section 110 against downward force that would be imparted on cutting member 100 as food items are pressed against member 100 through chute 22. This reduces the stress that could be imparted to the connection between driving member 28 and driven member 112.

Disposed on chute member 22 is a pair of projections 142 and 144 spaced apart to define a slot at 146. Locking ring 130 has at least one mating projection 148 which is received within slot 146 to secure locking ring 130 in place.

Housing 12 is generally L-shaped with a base member 32 and a generally upright member 34. Upright member 34 includes a handle portion 36 for ease of use and portability of appliance 10. Mounted within upright member 34 is a switch mechanism 38 for actuating the motor means to drive the cutter. Switch mechanism 38 includes a trigger 40 mounted within member 34 for movement between an OFF position as shown in FIG. 6 and an ON position as illustrated in FIG. 7. Pivotally connected to trigger 40 is a locking member 42. Locking member 42 has a tongue portion 44 that projects through an opening 46 in member 34. A channel 48 is formed in member 34. The vertical dimension of opening 46 is slightly larger than channel 48 so that in the position shown in FIG. 7 tongue portion 44 lies within channel 48 while it does not in FIG. 6.

Figure 2:
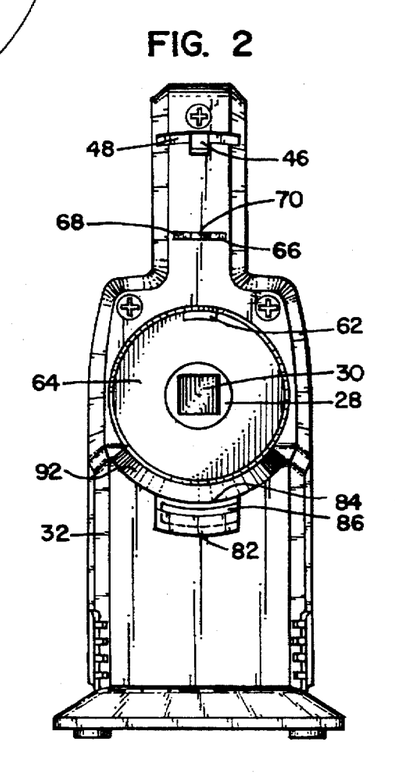
FIG. 2 is a front elevational view of the motor housing of the present invention.
Figure 3:
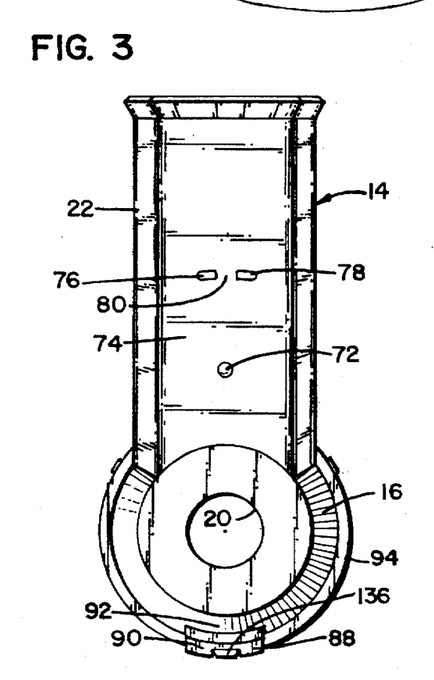
FIG. 3 is a rear elevational view of the cutter housing.
Figure 4:
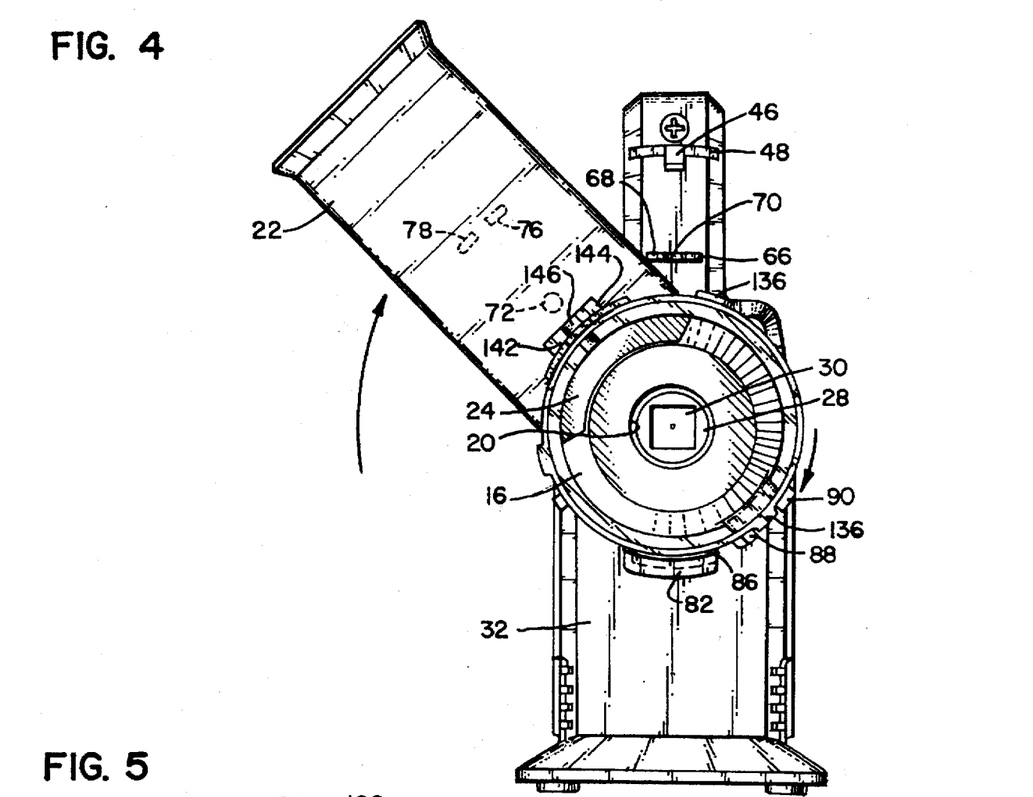
FIG. 4 is a front elevational view illustrating the operation of attaching the cutter housing to the motor housing.
Figure 5:
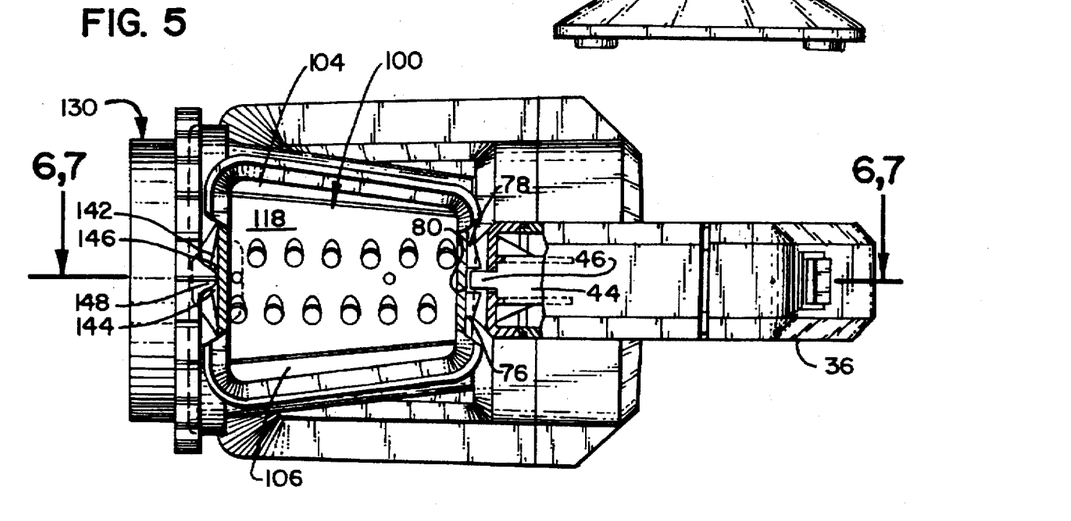
FIG. 5 is a top plan view of the appliance with the cutter housing attached to the motor housing and with portions broken away for clarity.
Figure 8:
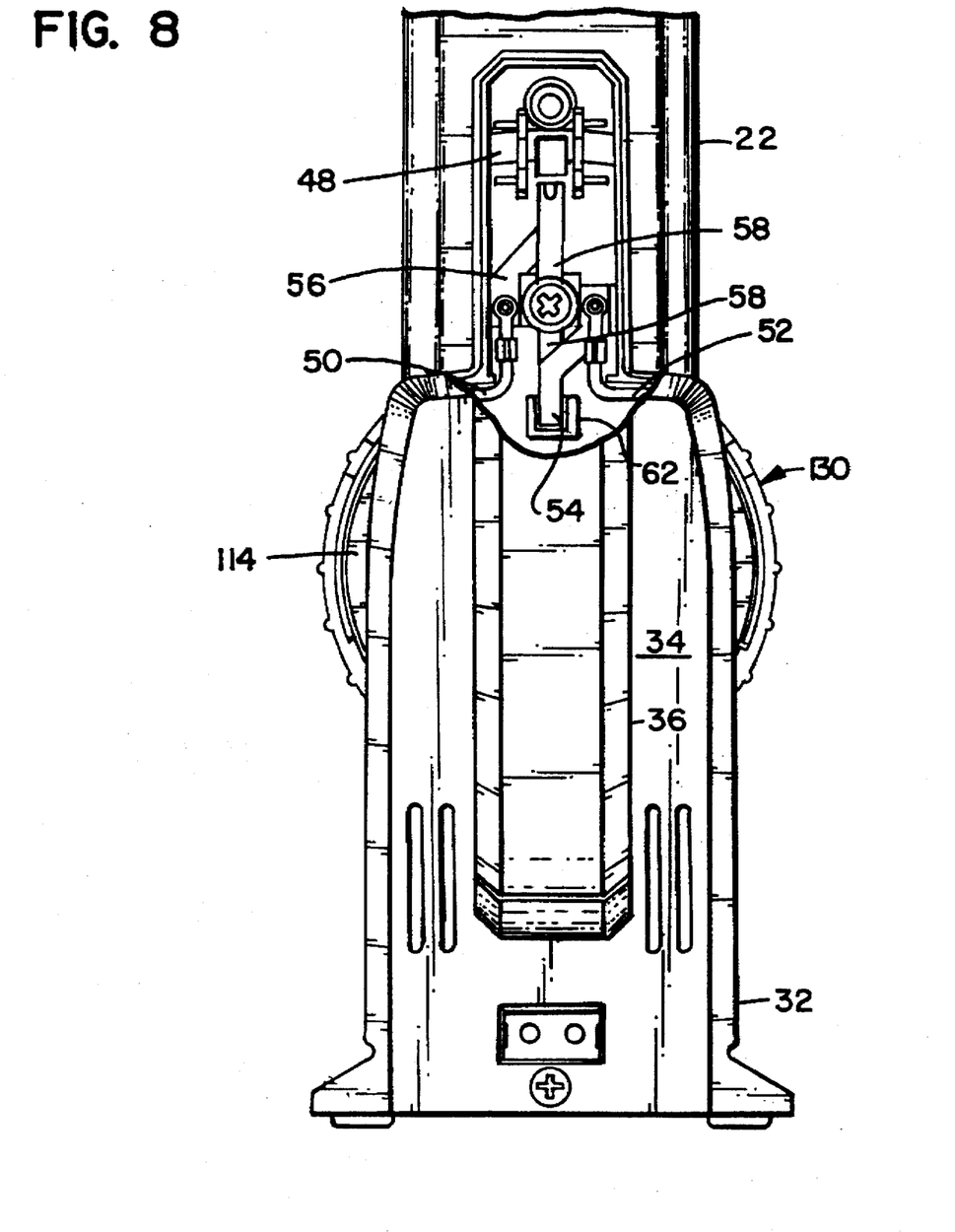
FIG. 8 is a rear elevational view of the appliance with the two housings connected and with portions removed.

As shown in more detail in FIG. 8 mounted within upright member 34 are two electrical conductors 50 and 52 connected to the electric motor.; To operate the motor a conductive path between conductors 50 and 52 must be established. Conductor 52 is connected to an electrical contact 54 which in the preferred embodiment may be a planar strip of copper or other conductive material. Conductor 50 is connected to a similar contact 56 also mounted within upright member 34. Aligned and in close proximity to at least a portion of contacts 54 and 56 is a contact member 58. Extending from locking member 42 is a tab 60 positioned to engage contact 58 when locking member 42 is in the position shown in FIG. 7. In this position electrical contact is established between contacts 58 and 56. Attached to contact 58 at its lower end is a tab 62. Upright member 34 has a generally cylindrical recess at 64 for receiving member 16 of housing 14. Tab 62 extends into recess 64 as shown in FIG. 2. When housing 14 is attached to housing 12, member 16 engages tab 62 whereby contact 58 is forced into engagement with contact 54 as shown in both FIGS. 6 and 7. Disposed on the surface of upright member 34 and projecting therefrom is a pair of key members 66 and 68 which define a keyway at 70. Members 66 and 68 and channel 48 have cooperating structure on chute member 22. A nub or projection 72 is positioned on a back wall 74 of chute member 22 to be received within keyway 70 when housing 14 is rotated into an upright position with respect to housing 12 as illustrated in FIG. 4. It should be understood that the location of key members 66 and 68 and cooperating projection 72 could be reversed. In other words, members 66 and 68 could be disposed on chute member 22 with projection 72 on upright member 34. Also disposed on surface 74 and projecting therefrom are a pair of key members 76 and 78 defining a slot 80. Key members 76 and 78 are disposed so that upon rotation of the housing 14 to the upright position as illustrated in FIG. 4 members 76 and 78 are received within channel 48 in member 34. Then when trigger 40 is actuated to turn on the motor, tongue portion 44 moves into channel 48 between key members 76 and 78 as shown in FIG. 6. Housing 14 is thereby locked into position while the motor is on because tongue portion 44 acts as a stop to prevent key members 76 and 78 from being rotated out of channel 48. While in the embodiment illustrated in the drawings trigger 40 and locking member 42 are operatively connected together, it is also possible within the scope of the present invention to use a locking member actuated independently of the switch controlling the electric motor.

Disposed on the front surface 82 of base member 32 is a pair of generally arcuate rail members 82 and 84 which define a slot 86. Disposed on the bottom of member 16 is a pair of tabs 88 and 90. Tabs 88 and 90 are designed to be frictionally received within slot 86 to attach member 16 to base 32. Other equivalent means for achieving a frictional attachment between base member 32 and member 16 may also be utilized. Base 32 has a surface 92 curved to conform generally to an outer surface 94 of member 16 to provide support therefor particularly in response to the force exerted by pressing food products downward through chute 22.

The operation of the present invention will now be described with particular reference to the attachment of housing 14 to housing 12. As shown in FIG. 4 housing 14 is placed with base member 16 on base 32 and with chute member 22 at an angle offset with respect to the vertical. Housing 14 is then rotated as shown by the arrows in FIG. 4 so that tabs 88 and 90 slide within slot 86 and frictionally engage members 82 and 84. At the same time projection 72 is rotated into keyway 70 and key members 76 and 78 are rotated into position within channel 48. Projection 72 is received within keyway 70 and serves to align housing 14 in proper upright position so that upon actuation of switch mechanism 38 to turn the electric motor on, members 76 and 78 will be properly oriented so that tongue portion 44 of locking member 42 will be pivoted into slot 80 to lock housing 14 in the upright position. Cutting member 100 may be secured into housing 14 by ring 130 either before of after housing 14 is locked into its upright position. As shown in FIGS. 6 and 7 when member 16 is positioned on base 32 electrical contact Will be established between contacts 54 and 56. When the trigger 40 is actuated to take the position shown in FIG. 6 locking member 42 is pivoted downward causing tab 60 to force contact 58 into engagement with contact 56. This completes the electric circuit for the motor which then begins to drive the rotating cutter. Simultaneously housing 14 is locked into position through the movement of tongue portion 44 into slot 80. Thus, so long as the electric motor is running housing 14 cannot be rotated out of its upright alignment either intentionally or inadvertently. Further, member 16 is supported on base 32 through the engagement of surfaces 92 and 94. This provides support as food items are being pressed down through chute member 22 preventing the appliance from tipping over if it is used on a countertop.

As shown in FIG. 1, the operator may hold the appliance by handle portion 36 and direct the sliced or shredded food items into a collecting bowl or directly onto any other desired surface. The cutting member 100 can be replaced by releasing locking ring 130 and removing the cutting member 100 through opening 18 in member 16. When the food slicing or shredding tasks are complete, housing 14 is removed and housing 14, cutting member 100 and locking ring 130 may be easily cleaned.

The present invention thus provides a hand held, portable food processor where the housing for the cutting means can be easily removed for cleaning purposes. Means are provided to lock the cutting means housing into position, and in one embodiment, the locking means is operatively connected to the switch that turns the driving motor on and off. In this manner, the user of the appliance is not required to separately engage or disengage the locking means. Thus, the locking means cannot be circumvented in normal use. The present invention also incorporates an improved cutting member which can be manufactured with less materials and manufacturing processes costs than the prior art.

I claim:

1. A food processor for cutting, slicing, shredding or grating and for discharging excised food from the front thereof comprising:
    (a) a housing including two portions;
    (b) one portion of said housing containing an electrical power supply and an actuator for said power supply, and wherein said one portion is adapted to be held and supported by the hand of the user for positioning the food processor in various orientations during operation thereof;
    (c) a conically shaped hollow second portion of said housing into which food is fed and from which excised food is discharged having a smaller rearward open end rotatably and releasably connected to said first portion of said housing, and having a larger forward open end at the front of the food processor for the discharge of excised food;
    (d) a rotatable hollow conical food cutter positionable in said second portion of said housing for cutting, slicing, shredding or grating food fed into said second conical portion and through which excised food passes having a smaller rearward end at said rearward smaller end of said second portion for operative rotational engagement with said power supply without being secured thereto and for ready release and removal of said food cutter from said second conical portion, and having a larger forward open end for the discharge of excised food from said forward end of said second portion;
    (e) a chute intermediate said open ends of said second conical portion of said housing and extending from and above said second portion through which food is fed into said food cutter, whereupon the food is excised by and passed into and through said food cutter and is discharged from the open forward ends of said food cutter and said second conical portion at the front of the food processor; and
    (f) a collar operatively connected to said larger end of said second conical portion of said housing movable into and out of contact with said food cutter for releasably retaining said food cutter in operative engagement with said power supply and within said second portion.

2. The food processor of claim 1, wherein said rotatable food cutting means comprises at least one arcuate cutting edge and one arcuate guiding edge spaced from said cutting edge and comprising a cutting zone therebetween for the passage of excised food.

3. The food processor of claim 1, wherein said rotatable food cutting means comprises a plurality of arcuate blade sections which are spaced apart from each other, wherein each blade section has a trailing guiding edge and a leading cutting edge, and wherein a trailing guiding edge of one blade section and a leading cutting edge of an adjacent blade section comprises a cutting zone therebetween through which excised food passes.

4. The food processor of claim 3 wherein said arcuate blade sections extend about the perimeter and between the ends of said food cutting means.

5. The food processor of claim 1, wherein said processor comprises a plurality of food cutting means with different cutting means for cutting, slicing, shredding or grating, and wherein each of said food cutting means is adapted to be removably inserted and contained in said second portion of said housing.

6. The food processor of claim 1, wherein said food delivery means is an open chute fixedly secured to and extending directly from said second portion of said housing.

7. The food processor of claim 1, further comprising a collar releasably connected to said second portion of said housing which includes a bearing means in contact with the discharge end of said cutting means for releasably retaining said cutting means in operative engagement with said power supply while positioned within said second portion, and an unobstructed open center portion through which excised food exits from the food processor, and wherein said collar is adapted to be released from said second portion to cause disengagement of said food cutting means from said power supply and to allow the removal thereof from second portion of said housing.

8. The food processor of claim 1, wherein said power supply means comprises:
    (a) a source of electrical power within or connected to said first portion;
    (b) rotatable motor means operatively connected to said source of electrical power for converting electrical to mechanical energy; and
    (c) means operatively connected to said rotatable motor means and adapted to engage and rotate said food cutting means for cutting, slicing, shredding or grating.

9. The food processor of claim 8, wherein the source of electrical power is at least one battery.

10. The food processor of claim 1, wherein the food processor is cordless and said power supply means are operated by rechargeable battery means.

11. A cordless, hand-holdable food processor for cutting, slicing, shredding or grating and for dischargeable excised food from the front end thereof, comprising:
    (a) a housing including two portions;
    (b) one portion of said housing containing a rechargeable battery operated rotatable power supply and an actuator for operating said power supply;
    (c) a conically shaped hollow second portion of said housing into which food is fed and from which excised food is discharged having a smaller rearward open end rotatably and releasably connected to said first portion of said housing, and having a larger forward open end at the front of the food processor for the discharge of excised food;
    (d) a rotatable hollow conical food cutter positionable in said second conical portion of said housing for cutting, slicing, shredding or grating food fed into said second portion and through which excised food passes having a smaller rearward end at said rearward smaller end of said second portion for operative rotational engagement with said power supply without being secured thereto and for ready release and removal of said food cutter from said second conical portion, and having a larger forward open end at and for the discharge of excised food from said forward end of said second portion;

(e) an open ended chute intermediate said open ends of said second conical portion of said housing integral with and extending from and above said second portion, and through which food is fed into said food cutter, whereupon the food is excised by and passed into and through said food cutter and is discharged from the open forward ends of said food cutter and said second conical portion at the front of the food processor, and (f) a collar operatively connected to the larger end of said second conical portion of said housing movable into and out of contact with said food cutter for releasably retaining said food cutter in operative engagement with said power supply and within said second conical portion.

12. The food processor of claims 1 or 11, wherein said rotatable food cutting means includes at least two arcuate blade sections which are spaced apart from each other and extend about the perimeter and between the ends of said food cutting means, and which are essentially positioned about the axis of rotation of said food cutting means to thereby facilitate the excising of food, wherein each blade section has a trailing guiding edge and a leading cutting edge, and wherein a trailing guiding edge of one section and a leading cutting edge of an adjacent blade section comprises a cutting zone therebetween which substantially corresponds to the thickness of the excised food and through which excised food passes.

13. The food processor of claim 11, wherein said second portion of said housing and said rotatable food cutting means have complementary conical shapes.

14. The food processor of claim 12, comprising a plurality of said food cutting means with different cutting means for cutting, slicing, shredding or grating, and wherein said food cutting means are interchangeable.

15. The food processor of claims 1 or 11, further comprising plunger means insertable in said open chute to facilitate the feeding of food to said food cutting means.

* * * * *